United States Patent [19]

Dasovich

[11] Patent Number: 4,497,238

[45] Date of Patent: Feb. 5, 1985

[54] REVERSIBLE HIGH-HAT CYMBAL STAND

[76] Inventor: Barney A. Dasovich, 5214 W. Sunset Hwy., Spokane, Wash. 99204

[21] Appl. No.: 595,695

[22] Filed: Apr. 2, 1984

[51] Int. Cl.[3] .............................................. G01D 13/00

[52] U.S. Cl. ...................................... 84/421; 84/422 R

[58] Field of Search .................. 84/422 H, 421, 422 R

[56] References Cited

U.S. PATENT DOCUMENTS

| | | | |
|---|---|---|---|
| 2,417,972 | 3/1947 | D'Arcy | 84/422 R |
| 3,167,995 | 2/1965 | LaLonde | 84/421 |
| 3,464,305 | 9/1969 | Meazzi et al. | 84/422 R |
| 4,122,750 | 10/1978 | Rinker | 84/421 |
| 4,216,696 | 8/1980 | Alexis, Jr. | 84/422 R |

FOREIGN PATENT DOCUMENTS

| | | | |
|---|---|---|---|
| 1382432 | 1/1975 | United Kingdom | 84/422 H |

*Primary Examiner*—L. T. Hix

*Assistant Examiner*—Douglas S. Lee

*Attorney, Agent, or Firm*—Wells, St. John & Roberts

[57] ABSTRACT

Disclosed is a reversible high-hat cymbal stand. The cymbal stand can be operated in a first mode of operation wherein the foot pedal or other actuator can be pressed downwardly to pull the upper cymbal into contact with the lower cymbal. In the second mode of operation the foot pedal or other actuator is connected to the lower cymbal which is normally biased upwardly into contact with the upper cymbal. Depression of the foot pedal causes the lower cymbal to become spaced apart from the upper cymbal. Removal of the drummer's foot causes the lower cymbal to be biased against the upper cymbal without need for the player to maintain foot contact.

6 Claims, 10 Drawing Figures

REVERSIBLE HIGH-HAT CYMBAL STAND

TECHNICAL FIELD

The technical field of this invention is high-hat cymbal stands.

BACKGROUND OF THE INVENTION

High-hat cymbals are widely used by modern drummers to produce a distinctive type of cymbal sound. High-hat cymbals include an upper cymbal and a lower cymbal which are mounted adjacent to each other using a high-hat cymbal stand. The upper or lower cymbals can be struck individually or simultaneously to produce usual free ringing cymbal sounds. The high-hat cymbal stand also allows the cymbals to be struck and then be pressed together to produce a distinctly high-hat sound. The upper and lower cymbals can also be first pressed together and then struck to produce another cymbal sound.

The cymbals in high-hat cymbals are usually pressed together using a foot pedal and connection linkage which heretofore has drawn the upper cymbal down upon the lower stationary cymbal. Prior art high-hat cymbal stands require that the drummer press the cymbal stand foot pedal each time the upper cymbal is brought downwardly into contact with the lower cymbal. This type of actuation has been found satisfactory in many applications, but severely restricts the drummer's ability to use his foot for other purposes. In particular, drummers may wish to simultaneously play two base drums using both of their feet. In such drumming it is very difficult to effectively use high-hat cymbals because it is necessary to depress the high-hat cymbal actuating pedal for a substantial period of time while the cymbals are struck in order to achieve the distintive high-hat cymbal sound.

It is an object of this invention to provide a high-hat cymbal stand having a first mode of operation wherein one cymbal is biased away from the other cymbal but which can be drawn there against using a foot pedal or other actuator; and a second mode of operation wherein one cymbal is biased against the other cymbal and the biased cymbal can be separated therefrom by using the same actuator.

It is also an object of this invention to provide such a high-hat cymbal stand which can also be very easily dismantled and packed in a compact arrangement.

These and other objects and advantages of the invention will be apparent from the description of the invention and its novel features given herein.

BRIEF DESCRIPTION OF THE DRAWINGS

A preferred and alternate embodiment of this invention is illustrated in the accompanying drawings, in which.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

Figure 1:
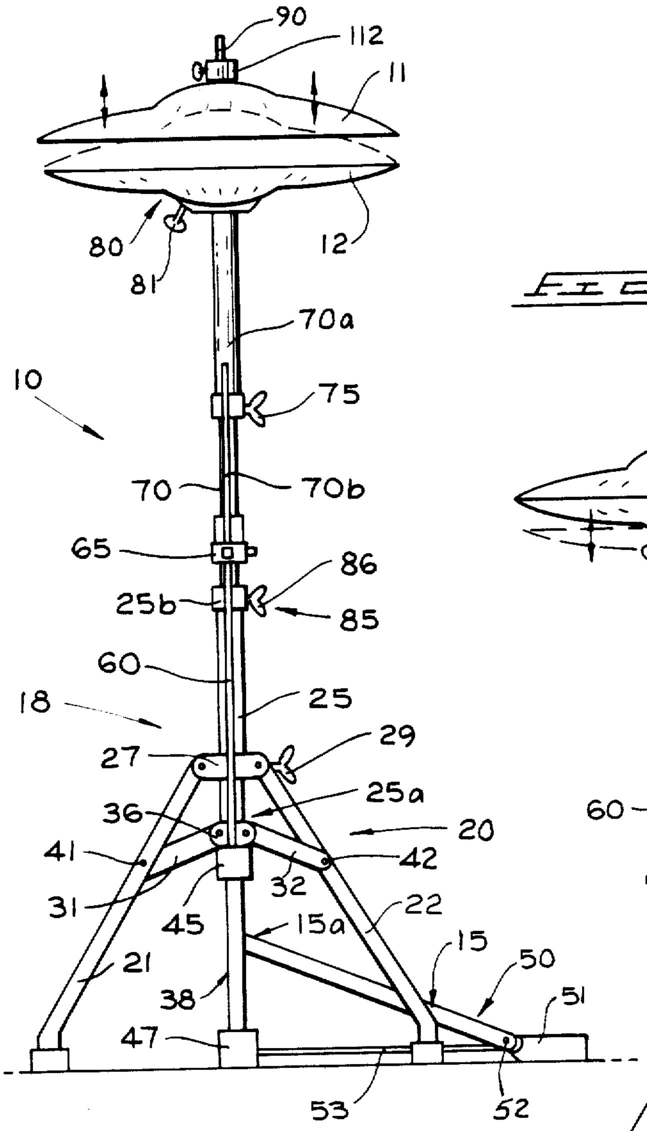
FIG. 1 is a side elevational view of a preferred embodiment of the reversible high-hat cymbal stand of this invention.

FIG. 1 is a side elevational view showing a preferred embodiment of reversible high-hat cymbal stand according to this invention. Reversible high-hat cymbal stand 10 is used for supporting and playing a first or upper cymbal 11 and a second or lower cymbal 12. Cymbals 11 and 12 are held in face-to-face relationship and can be played in either of two modes of operation. In the first mode of operation the upper cymbal is biased upwardly and can be brought downwardly into contact with lower cymbal 12 using foot pedal 15 or some other actuating means. In the second mode of operation the lower cymbal 12 is biased upwardly and into contact with upper cymbal 11. Lower cymbal 12 can be moved downwardly to become spaced apart from upper cymbal 11 by pressing upon foot pedal 15. The structure of the cymbal stand will now be explored in full detail.

Cymbal stand 10 includes a base framework 18. Base framework 18 includes a tripod leg arrangement 20 having first, second and third legs 21, 22 and 23. Base framework 18 also preferably includes a tubular central stem 25. A leg ring 27 is slidably mounted on central stem 25 and can be securely positioned thereon using wing bolt 29 or some other suitable fastening means. Legs 21, 22 and 23 are pivotally mounted to leg ring 27.

Tripod leg arrangement 20 also includes first, second and third struts 31, 32 and 33 which are pivotally connected to legs 21, 22, and 23 at pivots 41, 42 and 43, respectively. Struts 31, 32 and 33 are also pivotally connected to a strut ring 36. Strut ring 36 is preferably fixed at the lower end **25*a* of central stem tube 25**.

Figure 3:
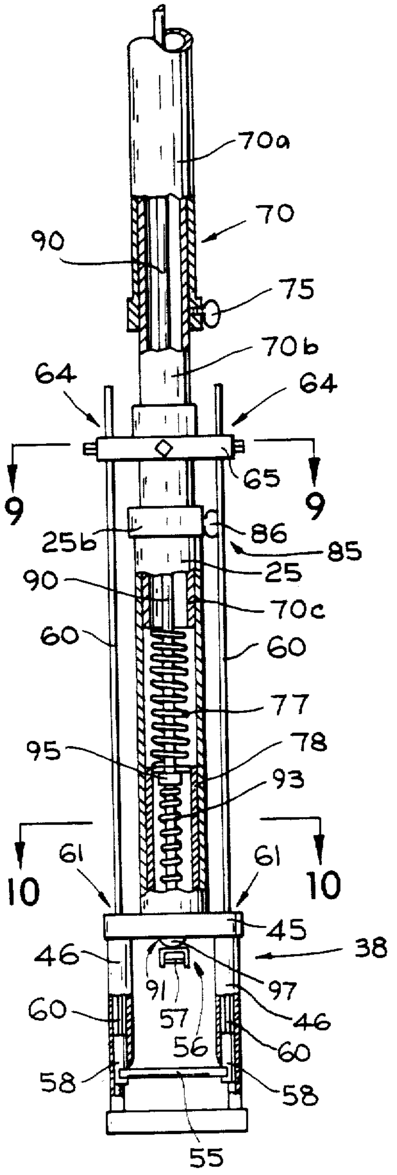
FIG. 3 is a partial enlarged front elevational view of the lower portion of the high-hat cymbal stand of FIGS. 1 and 2, portions have been removed and are shown in cross section.

Base framework 18 also includes an actuator extension 38 which extends downwardly from the lower end **25*a* of tubular central stem 25. FIG. 3 shows that actuator extension 38 includes a transverse bar 45 and two slide tubes 46. A bottom piece 47 is connected to lower ends of slide tubes 46** securing the slide tubes in positions approximately parallel to each other.

FIG. 1 shows an actuator means such as actuating assembly 50 connected to the base framework 18 as a means for actuating upper and lower cymbals 11 and 12. Actuating assembly 50 preferably includes foot pedal 15 which is pivotally connected to a heel piece 51 at pivot 52. A positioning rod 53 extends outwardly from bottom piece 47 in order to positively position the heel piece with respect to the base framework 18. Extension rod 53 is detachably connected to bottom piece 47 using a wing bolt (not shown) for ease of disassembly.

Figure 9:
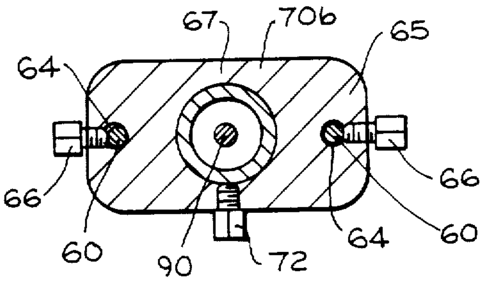
FIG. 9 is an enlarged cross-sectional view taken along line 9—9 of FIG. 3.
Figure 10:
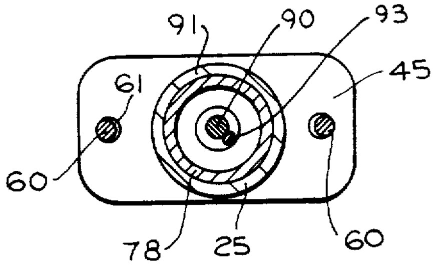
FIG. 10 is an enlarged cross-sectional view taken along line 10—10 of FIG. 3.

The top end 15a, of foot pedal 15 is detachably connected to either cross bar 55 (see FIG. 3) or connection pin 57. Cross bar 55 is connected to two cylindrical slide plugs 58 which are slidably received within slide tubes 46. Slide tubes 46 are provided with cutouts 46a to allow downward motion of cross bar 55. Two lower cymbal connecting rods 60 are connected at the upper ends of slide plugs 58. Lower cymbal connecting rods 60 extend upwardly through slide tubes 46 and out through apertures 61 in transverse bar 45. Lower cymbal connecting rods 60 extend upwardly from transverse bar 45 to sleeve bar 65 and extend through apertures 64 (FIG. 9). therein. Lower cymbal connecting rods 60 are detachably connected at each side of sleeve bar 65 using set bolts 66 or other fastening means which secure rods 60 to sleeve bar 65.

Sleeve bar 65 has a central aperture 67 which allows a lower cymbal tube 70 to extend therethrough. A set bolt 72 or other fastening means is used to securely but adjustably hold sleeve bar 65 at a fixed point along lower cymbal tube 70.

Lower cymbal tube 70 includes an upper portion 70a and a lower portion 70b. Lower portion 70b is telescopically received within upper portion 70a or vice versa. A wing nut 75 or other releasable securement means can be used to allow adjustment of the relative positions of upper part 70a and lower part 70b thereby allowing the overall length of lower cymbal tube 70 to be adjusted. This adjustment feature allows the height of the lower cymbal 12 above floor 13 or other supporting surface, to be adjusted by the drummer for his particular needs.

Lower cymbal tube 70 is preferably biased upwardly thereby causing lower cymbal 12 to be biased upwardly against upper cymbal 11 when the reversible cymbal stand 10 is being used in the second mode of operation. FIG. 3 shows one embodiment wherein the lower cymbal tube 70 is biased upwardly using a biasing means such as compression spring 77 positioned beneath the bottom of lower cymbal tube 70. A spacer tube 78 extends from transverse bar 45 upwardly to support the lower end of compression spring 77. Compression spring 77, spacer tube 78 and lower end of 70c of lower cymbal tube 70 are received within tubular central stem 25. Tubular central stem 25 thereby maintains appropriate axial positions of these three parts so that positive support and biasing action is transferred from lower framework 18 to cymbal tube 70.

Lower cymbal 12 is supported by lower cymbal tube 70 using a cymbal flange 80 or other suitable cymbal connection means. Cymbal flange 80 supports lower cymbal 12 which is resting thereon. A thumb screw 81 can be used to adjust tilt of the lower cymbal to prevent air entrapment when the cymbals are forced together.

Lower cymbal tube 70 can be fixed within central stem 25 using a lower cymbal tube connection means 85 which is preferably a wing bolt 86 which screws inwardly through a reinforcing head 25b of central stem 25 to engage the side of lower cymbal tube 70.

Upper cymbal 11 is connected to and supported by an upper or first cymbal connection means which includes an upper cymbal connecting rod 90. An upper cymbal mounting means 112 adjustably attaches cymbal 11 to rod 90. Upper cymbal connecting rod 90 extends downwardly and approximately coaxially through lower cymbal tube 70, compression spring 77, and a central aperture 91 formed in transverse bar 45. A first or upper cymbal biasing means such as compression spring 93 can advantageously be positioned between transverse bar 45 and a flange piece 95 which is securely positioned on upper cymbal connecting rod 90. Compression spring 93 biases upper cymbal connecting rod 90 upwardly.

A connection link 56 is connected at the bottom of rod 90 and adjacent bumper 97 which cushions upward motion of connecting rod 90. Upper cymbal connecting rod 90 is preferably threaded and received on a threaded opening in connection link 56 and bumper 97 thereon.

FIGS. 4–7 show a preferred form of reversible actuator connection means which can be used with cymbal stands made according to this invention. The actuator used with this embodiment is a foot pedal 15 which is pivotally mounted to heel piece 51 at the heel end of the foot pedal. A reversible link 100 is pivotally connected at the toe end 15a using a pivot pin 101. Reversible link 100 has a hanging hook 102 which is adapted to hang from connection pin 57 of connection link 56 when in the first position shown in FIGS. 6 and 7. Reversible link 100 also has a pushing hook 103 which is adapted to rest upon and engage cross bar 55 when in the second position shown in FIGS. 4 and 5.

The first mode of operation of cymbal stand 10 allows the upper cymbal 11 to be pulled downwardly in response to foot pressure applied to foot pedal 15 or other actuating means. In this first mode of operation the reversible link 100 is placed in the first position shown in FIGS. 6–7. In the first position hanging hook 102 is positioned over connection pin 57. Connection pin 57 is rigidly connected to a horseshoe shaped piece 56a, both forming connection link 56. Connection link 56 is connected to upper cymbal connecting rod 90 which in turn is connected directly to upper cymbal 11.

Forcing foot pedal 15 downwardly causes the pedal to pivot about pivot 52 at heel piece 51. Force applied to foot pedal 15 is transmitted by link 100 and hook 102 to connection pin 57 and through connection link 56. Connection link 56 pulls upper cymbal connecting rod 90 downwardly against the biasing force applied by upper cymbal biasing spring 93. This causes upper cymbal 11 which was previously in an extended position spaced apart from lower cymbal 12 to move downwardly and into a retracted position in contact with the lower cymbal as indicated by phantom lines in FIG. 1.

In the first mode of operation the cymbal stand and connected cymbals are typically used by pressing foot pedal 15 downwardly causing upper cymbal 11 to move downwardly into contact with lower cymbal 12. The contacting cymbals 11 and 12 are then usually struck with a drum stick. The foot pedal 15 is then intermittently released and depressed to achieve various combinations of high-hat sounds. During such operation the lower cymbal 12 is maintained in a stationary position by preferably securely fastening wing bolt 75 and wing bolt 86 which structurally unifies the central stem 25 and the upper and lower parts 70a and 70b of lower cymbal tube 70. Wing bolt 75 can also be released and the lower end of tube 70a rests upon sleeve bar 65.

Figure 4:
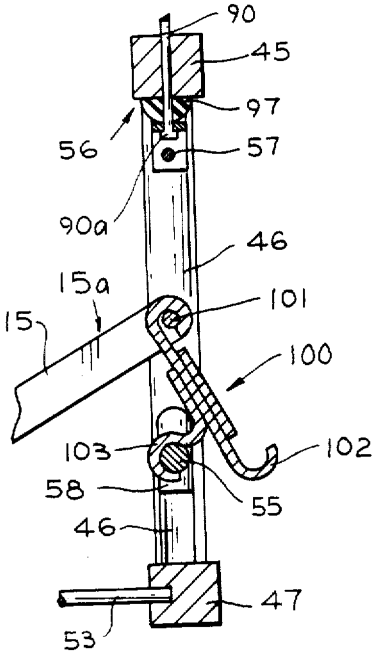
FIG. 4 is a partial side cross-sectional view taken along line 4—4 of FIG. 5.
Figure 5:
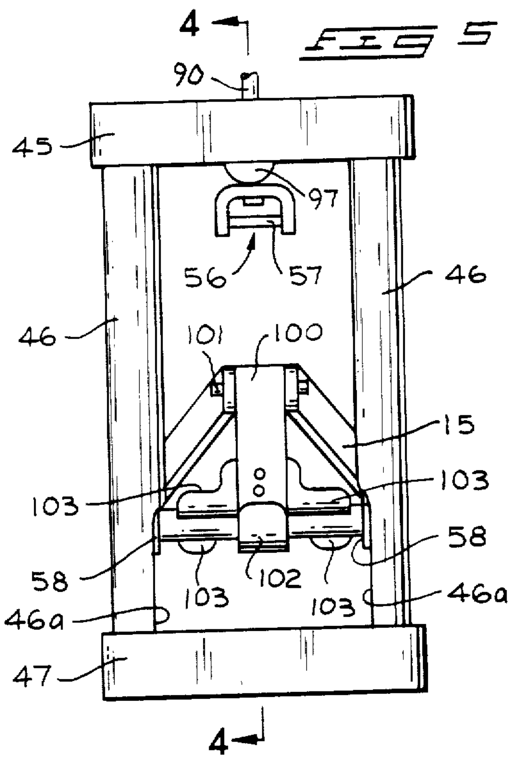
FIG. 5 is a rear elevational view of the foot pedal or actuator connection assembly of FIG. 1.
Figure 6:
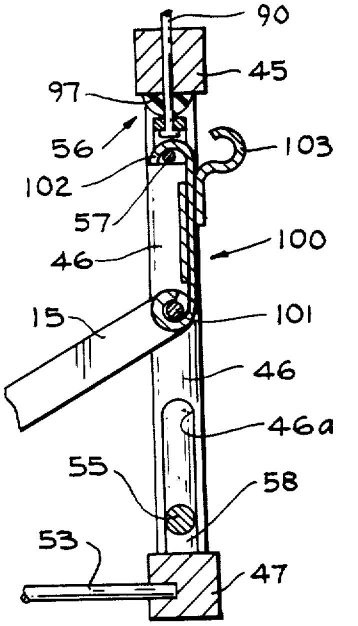
FIG. 6 is a side cross-sectional view taken along line 6—6 of FIG. 7, being similar to FIG. 4 with the actuator assembly in a second position.
Figure 7:
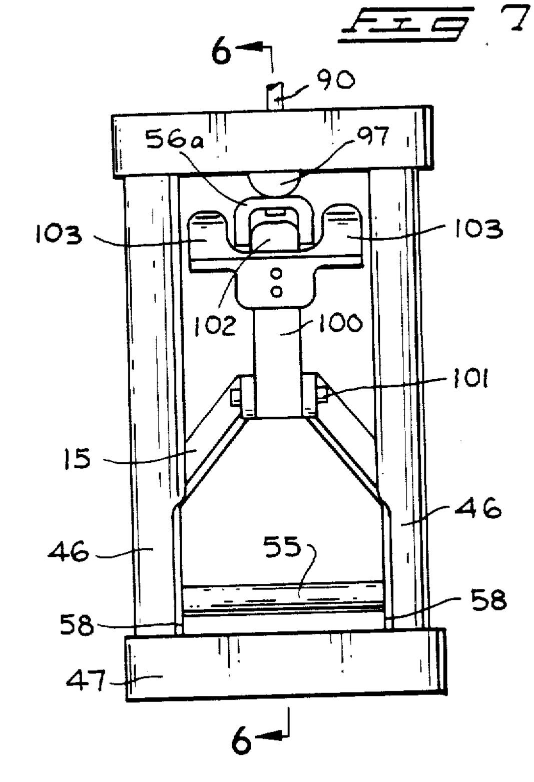
FIG. 7 is a rear elevational view similar to FIG. 5 with the actuator in the same position as shown in FIG. 6.

Cymbal stand 10 is converted into the second or reversed mode of operation by disconnecting the reversible link 100 from engagement with connection pin 57. This is done by lifting the toe end 15a of foot pedal 15 upwardly while simultaneously pulling link 100 rearwardly so that hook 102 slides up and over connection pin 57. Reversible link 100 is then swung downwardly and manipulated so that pushing hook 103 snaps into position upon cross bar 55 as shown in FIGS. 4–5.

In the second mode of operation foot pedal 15 is also depressed to cause it to pivot about pivot 52. Depressing foot pedal 15 causes cross bar 55 to experience a downward force which in turn forces slide plugs 58 downwardly within the interior bore of slide tubes 46. Downward motion of side slide tubes 46 causes the lower cymbal connecting rods 60 to move downwardly sliding through apertures 61. Sleeve bar 65 is rigidly connected to connecting rods 60 thereby applying force to lower cymbal tube 70 which is securely connected within central aperture 67 of sleeve bar 65.

Figure 2:
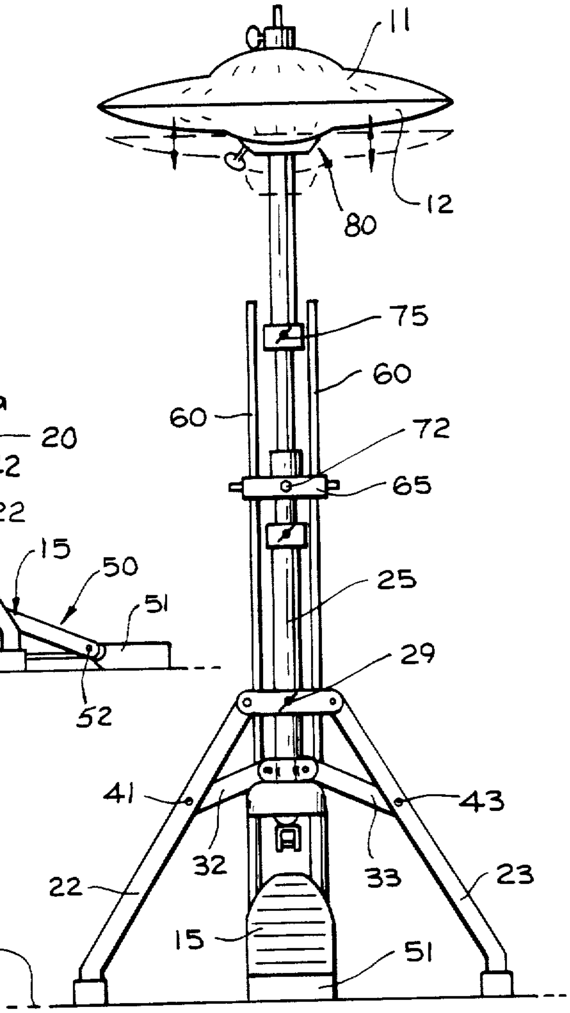
FIG. 2 is a front elevational view of the high-hat cymbal stand shown in FIG. 1.

Lower cymbal tube 70 must be slidable within tubular central stem 25 by assuring that connection means 85 is loosened such as by unscrewing wing bolt 86. Force applied to lower cymbal tube 70 through sleeve bar 65 thus causes lower cymbal tube 70 to move downwardly in opposition to the biasing force applied by compression spring 77 or other lower cymbal biasing means. Lower cymbal 12 is normally biased upwardly against the bottom of upper cymbal 11 into the contacting position shown in FIG. 2. Downward motion of lower cymbal 12 causes it to assume the spaced apart position as shown in phantom lines in FIG. 2. The second mode of operation thus is directly opposite from the first mode of operation in that foot pressure causes the cymbals to be spaced apart rather than forcing them together. The amount of force between the cymbals when biased together can be adjusted using upper cymbal mounting means 112 by positioning the upper cymbal at a point lower on rod 90.

To return the cymbal stand to the first mode it is desirable to fully depress the foot pedal and secure the lower cymbal connection means in the spaced apart position using connection means 85. Then the reversible link 100 is changed and other adjustments made, if necessary, as described above.

It will be apparent to those skilled in the art that the upper cymbal 11 can be connected to actuator means 50 using a variety of alternative forms of upper cymbal connection means which are effective at performing the function of upper cymbal connecting rod 90, connection link 56 and reversible link 100. Similarly, lower cymbal 12 can be connected to actuator means 50 using alternative lower cymbal connection means which are effective at performing the function of lower cymbal tube 70, sleeve bar 65, lower cymbal connecting rods 60, slide plugs 58, cross bar 55, and reversible link 100. Such obvious modifications of the upper and lower connection means are clearly contemplated by this invention.

Figure 8:
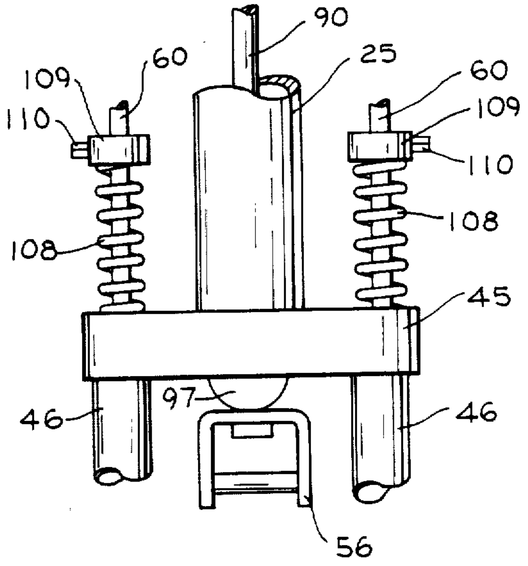
FIG. 8 is a partial front elevational view showing an alternative embodiment for biasing the lower cymbal.

Another area of obvious modification relates to the upper and lower cymbal biasing means such as springs 93 and 77, respectively. The upper cymbal 11 connection means and lower cymbal connections means can be biased in ways which have previously not been described. One example of an alternative biasing means is shown in FIG. 8. FIG. 8 shows two compression springs 108 which are positioned about connecting rods 60 at each side of the cymbal stand. Spring stops 109 have been correctly positioned on connecting rods 60 and secured thereto by set screws 110. In this arrangement downward movement of connecting rods 60 causes springs stops 109 to further compress springs 108 between the stops and transverse bar 45. Another alternative, not shown would use tension springs rather than compression springs in an analogous structure about rods 60.

It will be apparent to those skilled in the art that other alternative biasing arrangements can be devised for both upper cymbal connection means and lower cymbal connection means. Such modifications are clearly contemplated by this invention.

The cymbal stands described herein can be conveniently disassembled for compact storage. This is done by first removing cymbals 11 and 12. The wing bolt or other fastener securing positioning rod 53 to bottom piece 47 is then released. The reversible link 100 is designed for complete disconnection from the upper and lower cymbal connection means, thereby allowing the foot pedal actuator to be removed. The upper part 70*a* of lower cymbal tube 70 can also be released at wing bolt 75 and removed. Upper cymbal connecting rod 90 is also preferably constructed in two parts which can be unscrewed and a top part thereof withdrawn with the upper part 70*a*. Wing bolt 29 is then released and leg ring 27 is free for sliding upwardly upon tubular central stem 25, to collapse the legs 21–23 and struts 31–33 against stem 25. The cymbal stand 10 is thus disassembled and can be conveniently packed into a compact unit and stored in a trap case.

Cymbal stand 10 according to this invention is preferably constructed using steel or other metals which have been appropriately plated or otherwise protected against corrosion. Points of relative motion can advantageously be provided with antifriction bearings, bushings or other antifriction inserts to provide smoother action and longer wear of the cymbal stand.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A cymbal stand for holding first and second cymbals in face-to-face relationship, and for moving the cymbals relative to each other between spaced apart and contacting positions, comprising:

a base framework for contacting a supporting surface;

a first cymbal connection means slidably mounted to the base framework for motion between an extended position and a retracted position; the first cymbal connection means being adapted for mounting the first cymbal thereon;

a second cymbal connection means slidably mounted to the base framework for motion approximately parallel to the first cymbal connection means, and between a contacting position and a spaced apart positions; the second cymbal connection means being adapted for mounting the second cymbal thereon;

first biasing means for biasing the first cymbal connecting means into the extended position;

second biasing means for biasing the second cymbal connecting means into the contacting position;

actuator means movably connected to the base framework for actuation of the cymbal stand by a cymbal player; the actuator means being adapted for connection to either the first cymbal connection means or the second cymbal connection means; connection of the actuator means to the first cymbal connection means allowing the first cymbal means to be biased apart from the second cymbal and moved to and from the second cymbal; connection of the actuator means to the second cymbal connection means allowing the second cymbal means to be biased into contact with the first cymbal and moved from and to the first cymbal.

2. The cymbal stand of claim 1 wherein the base framework includes a plurality of collapsible legs which extend outwardly to support the cymbal stand.

3. The cymbal stand of claim 1 wherein:

the first cymbal connection means includes an upper cymbal connecting rod connectable to the actuator means;

the second cymbal connection means includes a second cymbal tube surrounding portions of the upper cymbal connecting rod; and at least one lower cymbal connecting rod connected to the actuator means and connected to said second cymbal tube.

4. The cymbal stand of claim 3 wherein said second cymbal tube is constructed in two parts which are adjustably securable together.

5. A high-hat cymbal stand for holding upper and lower cymbals in face-to-face relationship, and for moving the cymbals relative to each other between spaced apart and contacting relative positions, comprising:

a base framework having a plurality of legs extendible outwardly to support the cymbal stand in an upright position;

an upper cymbal connection means slidably mounted in the base framework for motion between an extended position wherein the upper cymbal connection means is extended upwardly and a retracted position wherein the upper cymbal connection means is retracted downwardly; the upper cymbal connection means being adapted for mounting the upper cymbal thereon;

an upper cymbal biasing means for biasing the upper cymbal connection means and any attached upper cymbal upwardly into the extended position;

a lower cymbal connection means slidably mounted to the base framework for motion approximately parallel to the upper cymbal connection means; the lower cymbal connection means being movable between a contacting position wherein the lower cymbal connection means is extended upwardly, and a spaced apart position wherein the lower cymbal connection means is retracted downwardly; the lower cymbal connection means being adapted for mounting the lower cymbal thereon;

a lower cymbal biasing means for biasing the lower cymbal connection means and any attached lower cymbal upwardly into the contacting position;

a foot pedal actuator means pivotally connected to the base framework for being depressed by a cymbal player; the actuator means being adapted for connection to either the upper cymbal connection means, for moving the upper cymbal downwardly, or to the lower cymbal connection means, for moving the lower cymbal downwardly; the actuator being biased upwardly by said upper and lower cymbal biasing means when connected thereto.

6. The cymbal stand of claim 5 wherein the foot pedal actuator comprises a foot pedal and a reversible link pivotally connected to the foot pedal and connectable to either the upper or lower cymbal connection means.

* * * * *